United States Patent
Rumpel et al.

(12) 
(10) Patent No.: US 6,209,205 B1
(45) Date of Patent: *Apr. 3, 2001

(54) METHOD FOR MANUFACTURING A REAR STRUCTURE FOR A MOTOR VEHICLE

(75) Inventors: Manfred Carl Rumpel, Bloomfield Hills; Daniel Foster Nagelhout, Plymouth, both of MI (US)

(73) Assignee: Ford Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/134,838

(22) Filed: Aug. 17, 1998

(51) Int. Cl.[7] ................................................. B21D 53/88
(52) U.S. Cl. ........................ 29/897.2; 29/401.1; 296/198
(58) Field of Search ............................. 29/897.26, 401.1, 29/430, 563, 793, 788; 296/195, 203.04, 198, 35.1

(56) References Cited

U.S. PATENT DOCUMENTS

| | | |
|---|---|---|
| 2,718,409 | 9/1955 | Kishline et al. . |
| 3,078,118 | * 2/1963 | Dzienis et al. ........................ 296/198 |
| 3,193,303 | 7/1965 | Allison et al. . |
| 3,469,649 | 9/1969 | Hoyt et al. . |
| 3,649,042 | 3/1972 | Allison . |
| 4,408,794 | * 10/1983 | Harasaki ............................. 296/198 |
| 4,738,387 | * 4/1988 | Jaufmann et al. ...................... 29/563 |
| 4,746,146 | * 5/1988 | Hirabayashi et al. ............... 296/35.1 |
| 4,757,607 | * 7/1988 | Sciaky et al. ........................... 29/793 |
| 4,875,733 | * 10/1989 | Chado et al. ......................... 296/198 |
| 4,919,474 | * 4/1990 | Adachi et al. ........................ 296/198 |
| 4,946,189 | 8/1990 | Manning . |
| 5,127,666 | * 7/1992 | Fujinaka et al. ..................... 296/198 |
| 5,174,628 | * 12/1992 | Hayatsugu et al. .................. 296/195 |
| 5,350,214 | * 9/1994 | Yamauchi et al. ................... 296/198 |
| 5,400,943 | * 3/1995 | Rossi ...................................... 29/430 |
| 5,580,121 | * 12/1996 | Dange et al. ......................... 296/198 |

FOREIGN PATENT DOCUMENTS

| | | |
|---|---|---|
| 1193434 | 11/1959 | (FR) . |
| 523274 | * 4/1955 | (IT) . |
| 4-221280 | * 8/1992 | (JP) . |

* cited by examiner

*Primary Examiner*—I Cuda Rosenbaum
*Assistant Examiner*—T. Nguyen
(74) *Attorney, Agent, or Firm*—Gregory P. Brown

(57) ABSTRACT

A method of manufacturing a rear structure of a motor vehicle for multiple body configurations reduces the costs and complexity in the assembly plant by eliminating separate lines heretofore required to manufacture such various body configurations. The method includes providing common right and left rear rail members (20), a floor pan (30) extending between the right and left rear rail members and being attached thereto forming a floor assembly. Providing right and left first wheelhouse inner members (40) when the vehicle is of the first configuration, or right and left second wheelhouse inner members (71) when the vehicle is of the second configuration, both first and second wheelhouse inner members each having a common flanges for attaching to the floor assembly.

1 Claim, 3 Drawing Sheets

METHOD FOR MANUFACTURING A REAR STRUCTURE FOR A MOTOR VEHICLE

BACKGROUND OF THE INVENTION

1. Field of the Invention

The present invention relates generally to a method of manufacturing vehicle chassis structures for motor vehicles. More particularly the present invention relates to a method of manufacturing rear structures for motor vehicles in a manner that allows assembly of multiple body configurations on a single assembly line.

2. Disclosure Information

In conventional motor vehicles, suspensions found on sedans generally include rear shock absorbers or struts mounted vertically for a variety of reasons. The upper ends of shock absorbers and strut assemblies are attached to structure usually located behind the rear seats. The desirable interior volume of the trunk is only minimally impacted by this design, as the trunk region immediately behind the rear seats is difficult to access. On the other hand, vehicles having different body configurations, such as sport utility vehicles, station wagons and vans, all seek to provide low, flat load floors. Additionally, consumers of these vehicles place a premium on total cargo volume as well as on the width of the load floor. For this reason, vehicle manufacturers have provided unique rear suspensions for such vehicles, tilting the rear shock absorbers from the usual vertical orientation so as to reduce their overall vertical intrusion in the vehicle while maximizing the load floor width.

In the normal course of designing and building motor vehicles, it is desirable to build multiple body configurations from a single vehicle platform. This allows common manufacturing equipment and processes to build a greater variety of related vehicles. To date, manufacturers have not been able to gain these efficiencies when constructing the rear structure for motor vehicles having a sedan style rear suspension and a unique wagon/van/SUV style rear suspension. The sedan construction has generally included relatively low and inboard frame rail members, vertically intrusive wheelhouse inners for supporting vertical shock or strut mounts, as well as a deeply drawn floor pan to allow for a deep trunk.

In contrast, the wagon/van/SUV configurations require relatively high and outboard frame rail members to allow the shock absorber to be tilted under the frame rail member. Additionally, these body configurations require unique attachment structure for the upper end of the shock absorber, as well as unique, non-vertically intrusive, wheelhouse inner members to provide maximum load floor width and finally a higher floor pan for mounting the upper end of the tilted shock absorbers. From this, it can be concluded that there are considerable differences in the structure of these two configurations.

To accommodate assembly of these vastly different vehicle structures, assembly plants must be provided with separate body assembly lines. The location of the welds between the floor pan assembly to the frame rails are unique, as are the welds between the wheelhouse inner member and the floor pan and quite often, even the quarter panel. Other equipment, including fixtures, sealers etc. must be uniquely configured for each of the unique body structures to accommodate the varying vehicle configurations, all at considerable expense to manufacturers and ultimately consumers.

It would be desirable to overcome the aforenoted difficulties with a method of manufacturing a rear vehicle structure using common assembly equipment and facilities, thus allowing manufacturers to make multiple body configurations on a common assembly line, which has not previously been available.

SUMMARY OF THE INVENTION

Therefore, the present invention provides an improvement over conventional assembly methods by providing a method of manufacturing a rear structure of motor vehicle that can accomodate multiple body configurations.

In accordance with the present invention, a method for manufacturing a rear structure of a motor vehicle allowing construction of at least two distinct vehicle body configurations on a single assembly line, the method comprising the steps of:

a:) providing common right and left rear rail members oriented generally longitudinally in said vehicle;

b:) providing a floor pan extending between said right and left rear rail members and attaching thereto to form a floor assembly, said floor assembly having right and left wheelhouse flanges thereon;

c:) providing right and left first wheelhouse inner members when the vehicle is of the first configuration, said right and left first wheelhouse inner members each having a first common flange for attaching said right and left first wheelhouse inner members to said wheelhouse flanges on said floor assembly; and d:) providing right and left second wheelhouse inner members when the vehicle is of the second configuration, said right and left second wheelhouse inner members each having a second common flange for attaching said right and left second wheelhouse inner members to said wheelhouse flanges on said floor assembly.

It is an advantage of the present invention to provide a simple, low cost method of manufacturing multiple body configurations on a single assembly line in a manner that has previously not been possible.

DETAILED DESCRIPTION OF THE PREFERRED EMBODIMENT

Figure 1:
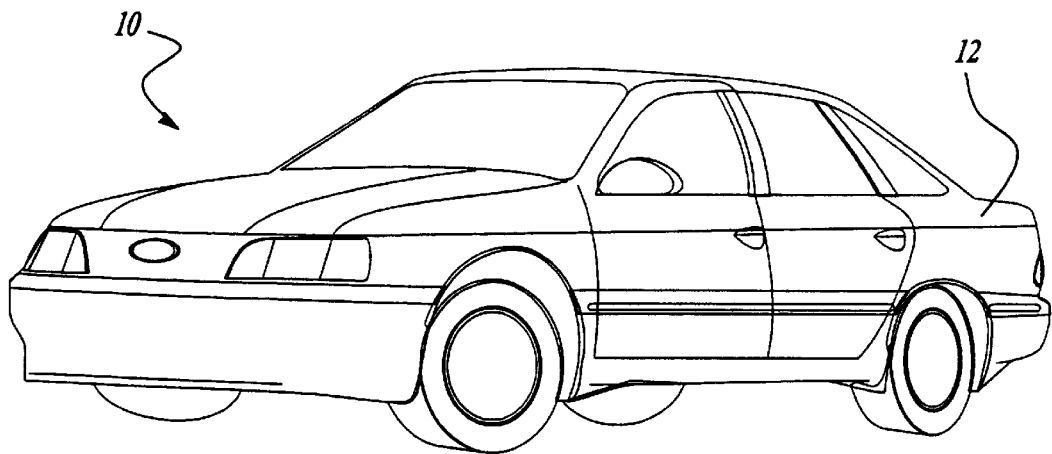
FIG. 1 is a perspective view of a sedan configuration of a motor vehicle manufactured in accordance with the present invention.
Figure 2:
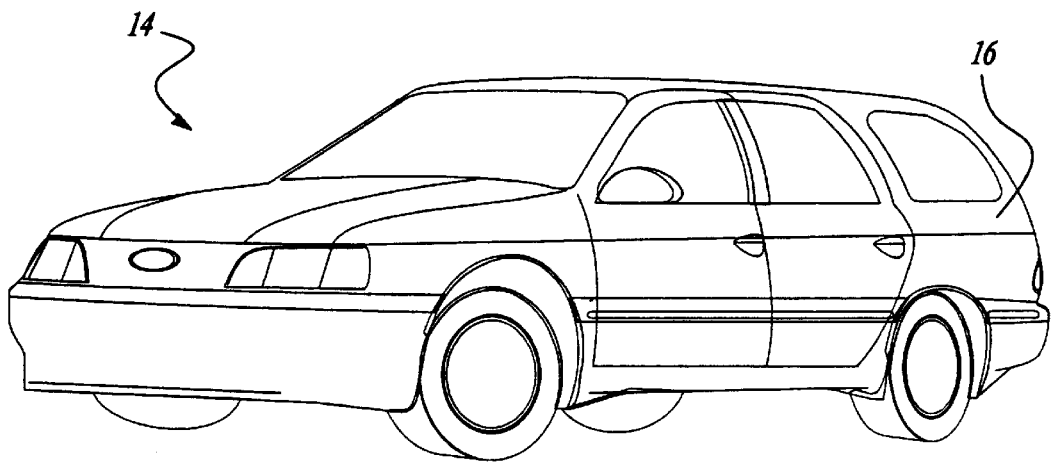
FIG. 2 is a perspective view of a wagon configuration of a motor vehicle manufactured in accordance with the present invention.

Referring now to FIGS. 1 and 2, two different vehicle configurations are shown having been built from a single vehicle platform, meaning they share as many common components as possible. Specifically, FIG. 1 shows what is commonly referred to as a sedan 10 characterized by a trunk 12. FIG. 2 shows a second configuration, commonly referred to as a wagon 14 having a rear cargo area 16 that is open to the forward passenger compartment. While the second configuration described in this detailed description will be of a wagon, the present invention is not so limited. The second configuration could be any of the popular vehicle configurations having as a design feature a large open cargo or additional passenger space behind the conventional passenger space of the sedan configuration. This would include vans as well as sport utility vehicles.

Figure 3:
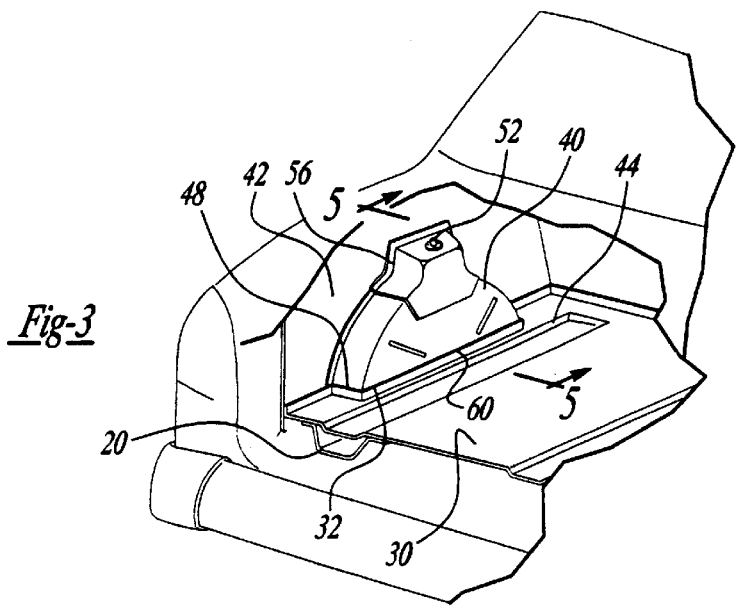
FIG. 3 is a partially cut away perspective view of a sedan configuration of a motor vehicle manufactured in accordance with the present invention.
Figure 5:
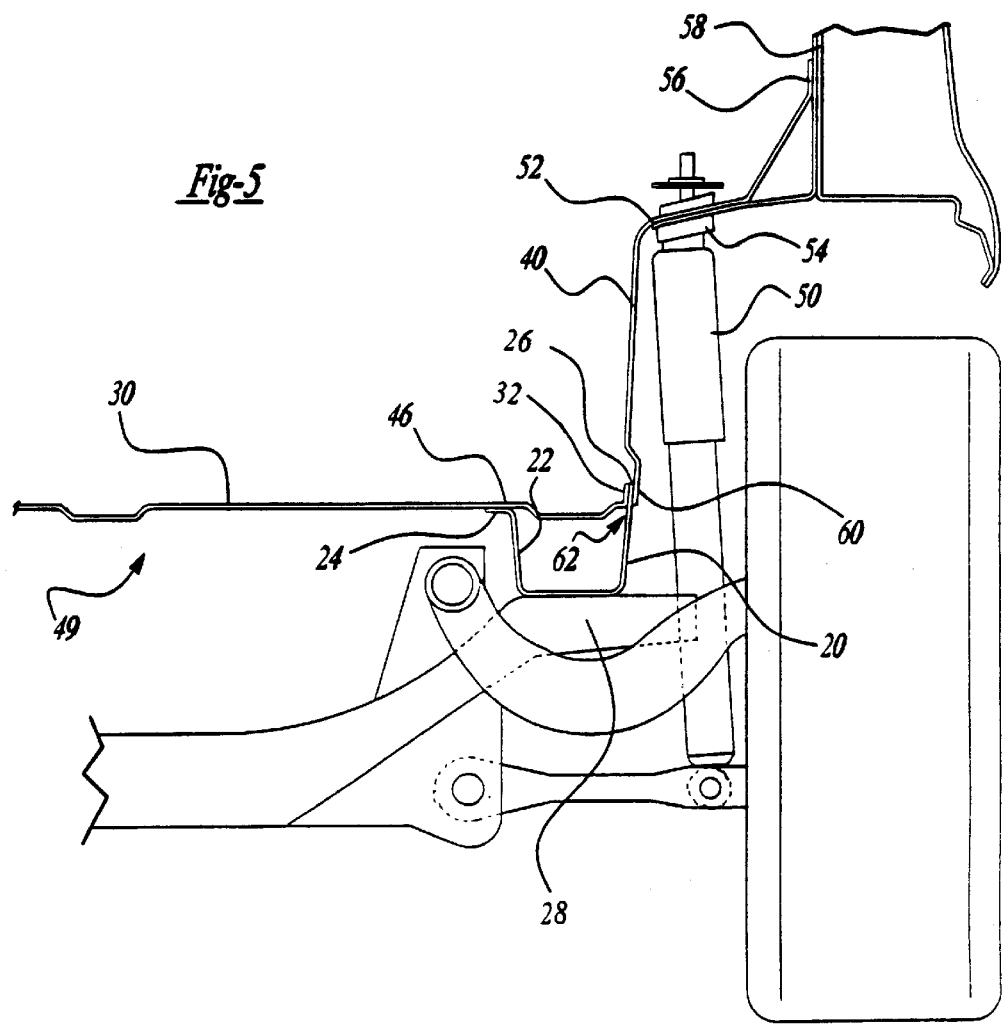
FIG. 5 is a section view taken along line 5—5 from FIG. 3 showing a suspension installed in a sedan configuration of a motor vehicle manufactured in a accordance with the present invention.

Referring now to FIGS. 3 and 5, the general architecture of the rear structure will now be described. First, it should be noted that the word "common" as used herein describes the existence of certain similar or substantially identical physical characteristics shared between components to the extent necessary to allow their assembly using the same assembly tools. However, it should be understood that "common" does not mean that the components are identical in every respect.

The rear underlying structure of the sedan body type includes right and left common frame rail members 20 generally oriented longitudinally within the vehicle. Note that for ease of description and reading only the left side of the vehicle will be described and illustrated, it being understood that the right side is symmetric with the left side except where noted. Each of the frame rails 20 generally forms a hat shaped cross-section, with a unshaped portion 22 and having an inboard rail flange 24 turned generally 90 degrees to the u-shaped portion and an outboard rail flange 26 extending generally upward from the unshaped portion. A subframe 28 for the suspension attaches to a bottom of the u-shaped portion 22 of the frame rail.

A floor pan 30 extends longitudinally within the vehicle and between the right and left rear rail members 20. The right and left sides of the floor pan include common outer flanges 32, shown here welded to the outboard rail flange 26. The common outer flanges 32 extend outboard forward and rearward of right and left wheelhouse inner members 40, where common outer flanges 32 would be welded to quarter inner panels 42, rather than to the outboard rail flange 26. In these regions, the floor pan includes common outer rail weld surfaces 44 for welding to the outboard rail flange 26. Also, along the forward and rearward edges of the wheelhouse inner members 40 the floor pan includes common right and left wheelhouse flanges 48. The right and left sides of the floor pan also include common inner rail weld surfaces 46 for welding to the inboard rail flange 24. The floor pan 30 and the right and left rear rail members 20 are welded together to form a floor assembly 49.

The right and left wheelhouse inner members 40, when the vehicle being built as a sedan, extend inwardly to provide package space for a vertical shock absorber 50. A vertical shock mount 52 is provided on top of each of the right and left wheelhouse inner members for securely attaching an upper end 54 of the vertical shock 50. The right and left wheelhouse inner members 40 also include a upper common flanges 56 which are welded to common inner flanges 58 on the quarter inner panels. The right and left wheelhouse inner members 40 also include common lower flanges 60 for attachment to the common right and left wheelhouse flanges 48 as well as to common right and left wheelhouse flanges 62 formed on the floor assembly by welding the common outer flanges 32 of the floor pan to the outboard rail flanges 26 of the frame rail members.

Figure 4:
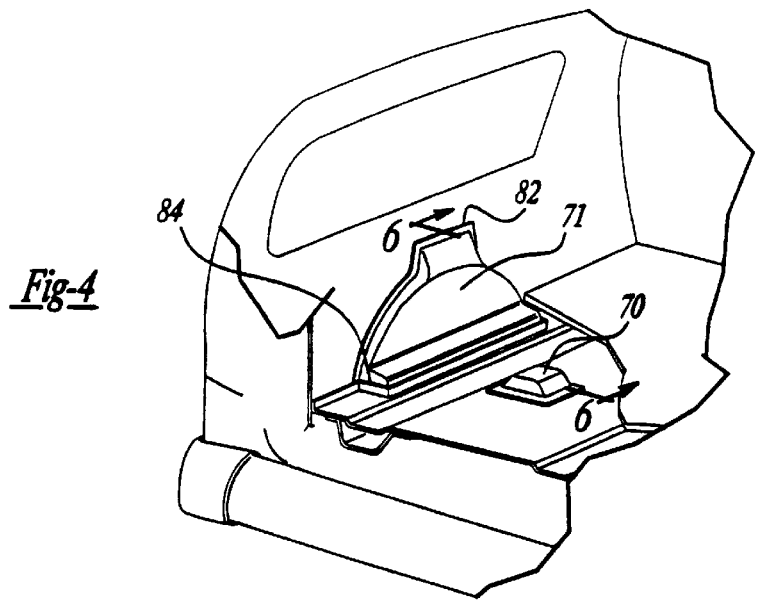
FIG. 4 a partially cut away perspective view of a wagon configuration of a motor vehicle manufactured in accordance with the present invention.
Figure 6:
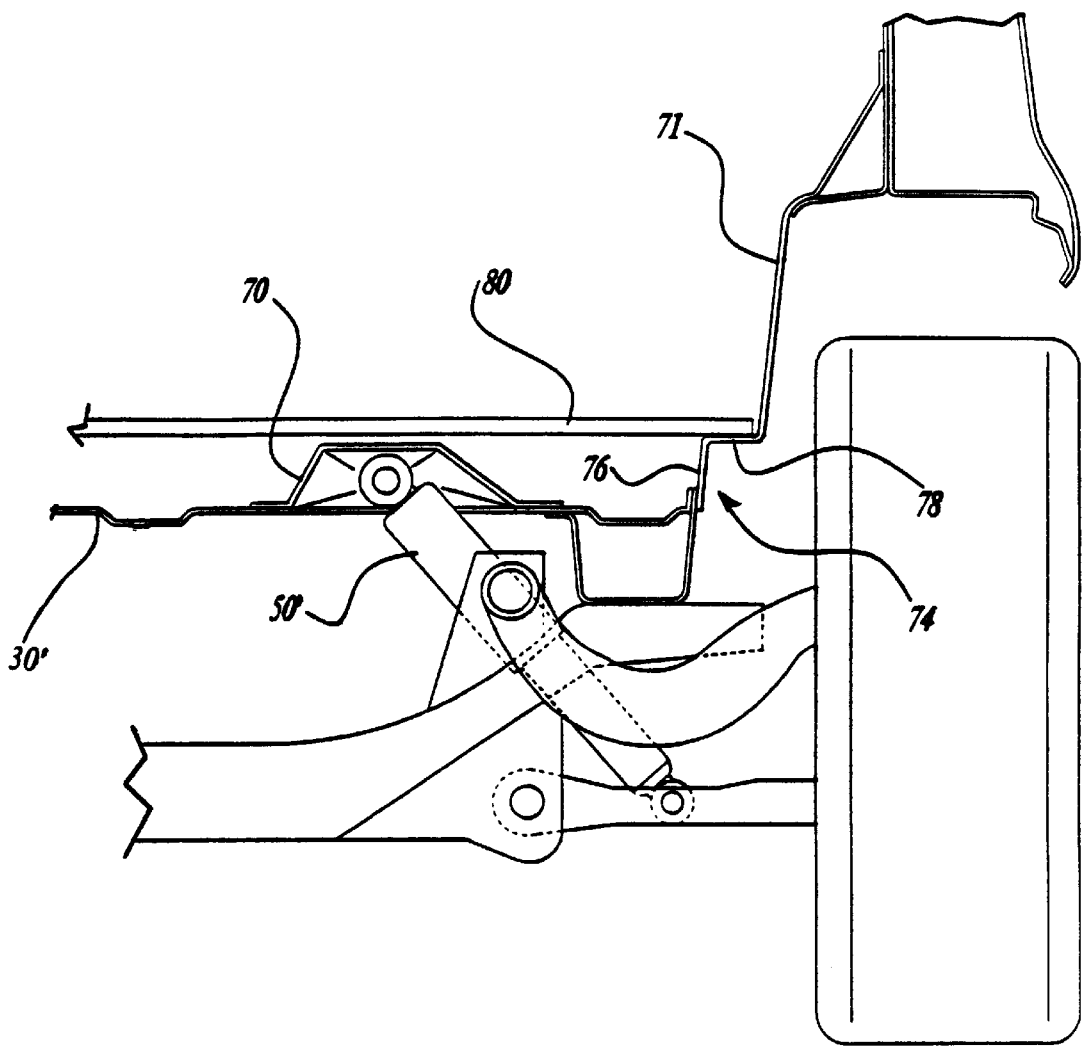
FIG. 6 is a section view taken along line 6—6 from FIG. 4 showing a suspension installed in a wagon configuration of a motor vehicle manufactured in a accordance with the present invention.

Referring now to FIGS. 4 and 6, the minimal differences between the first and second body configurations will now be described. The right and left frame rail members are the same. The floor pan is the same, except it includes right and left inboard shock mounts 70 to allow a shock absorber 50' to be tilted beneath the frame rail. Preferably the right and left inboard shock mounts 70 are formed or welded into the floor pan prior to delivery of the floor pan to the assembly line for completion of the floor assembly.

For the second body configuration, the wheelhouse inner member 71 does not extend inwardly to provide room for the vertical shock absorber 50. Rather, the wheelhouse inner member 71 includes a bridge portion 74 which has a vertical portion 76 extending upward from the floor assembly and a horizontal portion 78 extending outward therefrom to provide maximum space between the wheelhouse inner members 71 for a load floor member 80, which is placed on the horizontal portion 78 of the bridge portion 74. The wheelhouse inner members for the second body configuration include common upper flanges 82 and common lower flanges 84 for attachment to the vehicle structure in the same manner and physical location as the wheelhouse inner members in the first body configurations.

The method of the present invention will now be described, however, it being understood that the sequence of the steps are set forth here as an example and it is not intended to be a limitation of the present invention. Specifically, two distinct vehicle body configurations can be manufactured on a single assembly line by providing common right and left rear rail members, preferably securely fixtured on a set of jigs. Placing a floor pan onto the right and left rear rail members and welding along a predetermined path the floor pan and rear rail members to form a single floor assembly. Next, positioning right and left quarter inner panels along the floor assembly and welding them to the floor assembly along a second predetermined path. Lastly, depending on which body configuration is being built, providing either first or second wheelhouse inner members to be fixtured within the assembly made up of the floor assembly and quarter inner panels. Without regard for which body configuration is being manufacturing, welding the first or second wheelhouse inner members in position along a third predetermined weld path.

When the method of the present invention is completed, the resulting vehicle rear structure emerging from this single assembly line will be either of the first body configuration adapted to have a suspension with a vertical shock absorber or of the second body configuration adapted to have a tilted over shock absorber. Uniquely, the two body configurations were built on a single assembly line with simple, cost effective manufacturing equipment without regard for the body configuration type.

Various modifications and variations will no doubt occur to those skilled in the art to which this invention pertains. Those and all other variations which basically rely on the teachings by which this disclosure has advanced the art are properly considered within the scope of this invention as defined by the appended claims.

We claim:

1. A method for manufacturing motor vehicles having a first and a second distinct vehicle underbody configurations, said method comprising the steps of:

building a first distinct vehicle underbody configuration by:
providing right and left first rear rail members oriented generally longitudinally in said vehicle;

welding said first floor pan to said right and left first rear rail members to form a first floor assembly, said first floor assembly having right and left first wheelhouse flanges thereon;

providing right and left first wheelhouse inner members each having a first lower flange;

welding said first lower flange on said right and left first wheelhouse inner members to said right and left first wheelhouse flanges on said first floor assembly;

building a second distinct vehicle underbody configuration by;

providing right and left second rear rail members oriented generally longitudinally in said vehicle;

providing a second floor pan extending between said right and left second rear rail members;

welding said second floor pan to said right and left second rear rail members to form a second floor assembly, said second floor assembly having right and left second wheelhouse flanges thereon;

providing right and left second wheelhouse inner members configured differently from the right and left first wheelhouse inner members, each of said right and left second wheelhouse having a second lower flange; and welding said second lower flange on said right and left second wheelhouse inner members to said right and left second wheelhouse flanges on said second floor assembly;

wherein, for each of the first and second underbody configurations, said right and left first rear rail members are common with said right and left second rear rail members, said right and left first wheelhouse flanges are common with said right and left second wheelhouse flanges and said first lower flange on the right and left first wheelhouse inner members are common with the second lower flange on the right and left second wheelhouse inner members.

* * * * *